US011023118B2

(12) United States Patent
Takamizawa

(10) Patent No.: US 11,023,118 B2
(45) Date of Patent: Jun. 1, 2021

(54) MOTOR CONFIGURATION SELECTION DEVICE, MOTOR CONFIGURATION SELECTION METHOD, AND COMPUTER-READABLE MEDIUM

(71) Applicant: FANUC CORPORATION, Yamanashi (JP)

(72) Inventor: Suguru Takamizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 16/292,902

(22) Filed: Mar. 5, 2019

(65) Prior Publication Data
US 2019/0317660 A1 Oct. 17, 2019

(30) Foreign Application Priority Data
Apr. 16, 2018 (JP) .............................. JP2018-078283

(51) Int. Cl.
G06F 3/0484 (2013.01)
H02K 11/21 (2016.01)
H02K 1/27 (2006.01)
H02K 41/02 (2006.01)
G06Q 10/06 (2012.01)

(52) U.S. Cl.
CPC ......... *G06F 3/04847* (2013.01); *H02K 11/21* (2016.01); *G06Q 10/06315* (2013.01); *H02K 1/2706* (2013.01); *H02K 41/02* (2013.01)

(58) Field of Classification Search
None
See application file for complete search history.

(56) References Cited

U.S. PATENT DOCUMENTS

| 2005/0212513 | A1* | 9/2005 | Yamashita | G01D 5/2451 324/207.25 |
|---|---|---|---|---|
| 2006/0021450 | A1* | 2/2006 | Nallapa | G01P 3/481 73/862.326 |
| 2014/0108418 | A1* | 4/2014 | Elbaum | G06F 16/93 707/741 |
| 2014/0139848 | A1* | 5/2014 | Kanzawa | B41J 19/142 358/1.5 |

(Continued)

FOREIGN PATENT DOCUMENTS

| JP | H09-190483 A | 7/1997 |
| JP | 2004-053807 A | 2/2004 |

(Continued)

OTHER PUBLICATIONS

An Office Action mailed by the Japanese Patent Office dated May 19, 2020, which corresponds to Japanese Patent Application No. 2018-078283 and is related to U.S. Appl. No. 16/292,902; with English language translation.

*Primary Examiner* — Toan H Vu
(74) *Attorney, Agent, or Firm* — Studebaker & Brackett PC

(57) ABSTRACT

The present invention relates to a motor configuration selection device comprising: a selection condition acquisition unit that acquires a selection condition for an encoder to be provided at a motor; and a selection making unit that makes a selection of an encoder to be provided at the motor based on the selection condition acquired by the selection condition acquisition unit and the specification of the motor.

17 Claims, 10 Drawing Sheets

(56) References Cited

U.S. PATENT DOCUMENTS

| | | | | |
|---|---|---|---|---|
| 2016/0253706 A1* | 9/2016 | Kursar | ................... | H04W 4/44 |
| | | | | 705/14.58 |
| 2018/0198346 A1* | 7/2018 | Yoshida | ............. | G01D 5/34738 |
| 2019/0113922 A1* | 4/2019 | Koyama | ............ | F16M 11/2014 |
| 2019/0130669 A1* | 5/2019 | Boggio | .............. | G05B 23/0221 |
| 2020/0145069 A1* | 5/2020 | Ferrante | ................... | H04B 7/10 |

FOREIGN PATENT DOCUMENTS

| | | |
|---|---|---|
| WO | 2008/139800 A1 | 11/2008 |
| WO | 2014/054142 A1 | 4/2014 |

\* cited by examiner

FIG.4

| ENCODER MODEL NUMBER | MANUFACTURER | EFFECTIVE MEASUREMENT LENGTH | OVERALL SCALE LENGTH | RESOLUTION | POSITIONING ACCURACY | COMMUNICATION PROTOCOL | ENCODER TYPE | SCANNING SYSTEM | COST | DELIVERY TIME | MOUNT COMPATIBLE PART |
|---|---|---|---|---|---|---|---|---|---|---|---|
| ... | ... | ... | ... | ... | ... | ... | ... | ... | ... | ... | ... |
|  |  |  |  |  |  |  |  |  |  |  |  |
|  |  |  |  |  |  |  |  |  |  |  |  |
|  |  |  |  |  |  |  |  |  |  |  |  |

☐ NARROW DOWN BY COST  ☐ NARROW DOWN BY DELIVERY TIME  ☐ SORT BASED ON PRIORITY

PURCHASE PRICE UPPER LIMIT [ ]   DESIRED DELIVERY TIME [ ]

☐ MOUNT COMPATIBLE PART

FIG.5

| COMPARISON SOURCE ENCODER | ENCODER MODEL NUMBER | MANUFACTURER | EFFECTIVE MEASUREMENT LENGTH | OVERALL SCALE LENGTH | RESOLUTION | POSITIONING ACCURACY | COMMUNICATION PROTOCOL | ENCODER TYPE | SCANNING SYSTEM |
|---|---|---|---|---|---|---|---|---|---|
| MOUNT COMPATIBLE ENCODER1 | ... | ... | ... | ... | ... | ... | ... | ... | ... |
| MOUNT COMPATIBLE ENCODER2 | | | | | ///// | ///// | ///// | | |
| MOUNT COMPATIBLE ENCODER3 | | | ///// | ///// | ///// | | | | |

☐ SORT IN CONSIDERATION OF REQUIRED SPECIFICATION

MOTOR CONFIGURATION SELECTION DEVICE, MOTOR CONFIGURATION SELECTION METHOD, AND COMPUTER-READABLE MEDIUM

This application is based on and claims the benefit of priority from Japanese Patent Application No. 2018-078283, filed on 16 Apr. 2018, the content of which is incorporated herein by reference.

BACKGROUND OF THE INVENTION

Field of the Invention

The present invention relates to a motor configuration selection device, a motor configuration selection method, and a computer-readable medium.

Related Art

During conventional selection of the configuration of a motor, such as a rotary motor or a linear motor, an encoder for detecting the movement direction, angle, or stroke of a rotary body or a movable body has been selected together. A technique of selecting an encoder to be provided at a motor is described by patent document 1, for example.

Patent Document 1: PCT International Publication No. WO2014/054142

SUMMARY OF THE INVENTION

Selection of an encoder to be provided at a motor is subject to constraints in terms of an environment of use of the motor, a configuration of the motor, etc. Hence, selection of a proper encoder according to various conditions has been required. At this time, if information about an encoder from a catalog of the encoders is acquired, and whether the encoder conforms to an assumed use condition, a machine configuration, an operating condition, etc. is examined, it will take much time to decide an encoder. Further, if the examination is conducted in an erroneous method, or an item necessary for the examination is missing, for example, it becomes impossible to select a proper encoder. Further still, after selection of an encoder, a condition for placement of the encoder at a motor should be examined separately. This examination will also take time. In some cases, the examined placement condition is not always a suitable condition.

The present invention is intended to more properly select the configuration of an encoder to be provided at a motor.

(1) A motor configuration selection device according to the present invention (motor configuration selection device 1 described later, for example) comprises: a selection condition acquisition unit (selection condition acquisition unit 11b described later, for example) that acquires a selection condition for an encoder to be provided at a motor; and a selection making unit (selection making unit 11c described later, for example) that makes a selection of an encoder to be provided at the motor based on the selection condition acquired by the selection condition acquisition unit and the specification of the motor.

(2) The motor configuration selection device described in (1) may comprise a display control unit (UI display control unit 11a described later, for example) that displays a view showing a relationship between the placement of the encoder selected by the selection making unit and the placement of the motor determined when the encoder and the motor are put in their positions.

(3) In the motor configuration selection device described in (1) or (2), the selection making unit may select an encoder conforming to the selection condition based on a score given by putting weights on multiple items of the selection condition for the encoder.

(4) In the motor configuration selection device described in (1) to (3), the selection making unit may select an encoder to be provided at the motor based on at least one of the cost and delivery time of the encoder to be selected as the selection condition.

(5) In the motor configuration selection device described in (4), the selection making unit may select an encoder to be provided at the motor based on the selection condition including an environment of use of the motor, a maximum speed, a positioning accuracy, a communication protocol, an encoder type, and an effective movable area.

(6) In the motor configuration selection device described in (1) to (5), if the specification of the motor and the selection condition for the encoder do not match, the selection making unit may change the selection condition for the encoder to conform to the specification of the motor.

(7) In the motor configuration selection device described in (1) to (6), the selection making unit may define a different encoder as a candidate for selection having compatibility with the encoder conforming to the selection condition.

(8) In the motor configuration selection device described in (7), the selection making unit may present information in a distinguishing manner about a difference between the encoder conforming to the selection condition and the different encoder having the compatibility.

(9) In the motor configuration selection device described in (8), regarding the difference between the encoder conforming to the selection condition and the different encoder having the compatibility, the selection making unit may rank the different encoder having the compatibility based on a score given by putting weights on multiple items of the selection condition for the encoder.

(10) A motor configuration selection method according to the present invention comprises: a selection condition acquisition step of acquiring a selection condition for an encoder to be provided at a motor; and a selection making step of making a selection of an encoder to be provided at the motor based on the selection condition acquired in the selection condition acquisition step and the specification of the motor.

(8) A program according to the present invention causes a computer to implement: a selection condition acquisition function of acquiring a selection condition for an encoder to be provided at a motor; and a selection making function of making a selection of an encoder to be provided at the motor based on the selection condition acquired by the selection condition acquisition function and the specification of the motor.

According to the present invention, the configuration of an encoder to be provided at a motor can be selected more properly.

BRIEF DESCRIPTION OF THE DRAWINGS

FIG. 4 is a schematic view showing an example of an encoder selection auxiliary screen for assisting in the selection of an encoder;

FIG. 5 is a schematic view showing an example of a compatible part comparison screen on which the specifications of mount compatible parts are displayed in comparison to each other;

DETAILED DESCRIPTION OF THE INVENTION

Figure 1:
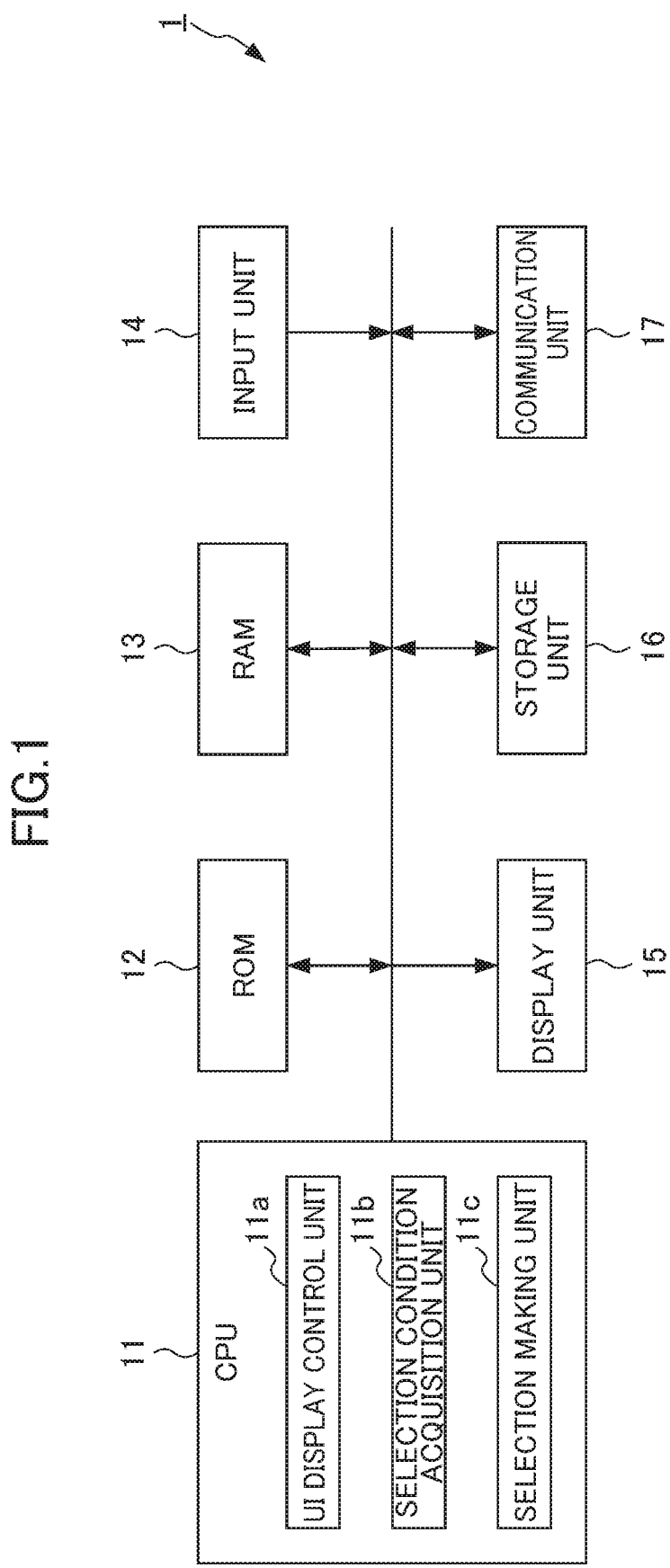
FIG. 1 is a block diagram showing the configuration of a motor configuration selection device according to an embodiment of the present invention.

An embodiment of the present invention will be described below by referring to the drawings.

[Configuration]

FIG. 1 is a block diagram showing the configuration of a motor configuration selection device 1 according to the embodiment of the present invention. As shown in FIG. 1, the motor configuration selection device 1 includes a central processing unit (CPU) 11, a ROM 12, a RAM 13, an input unit 14, a display unit 15, a storage unit 16, and a communication unit 17.

Figure 2:
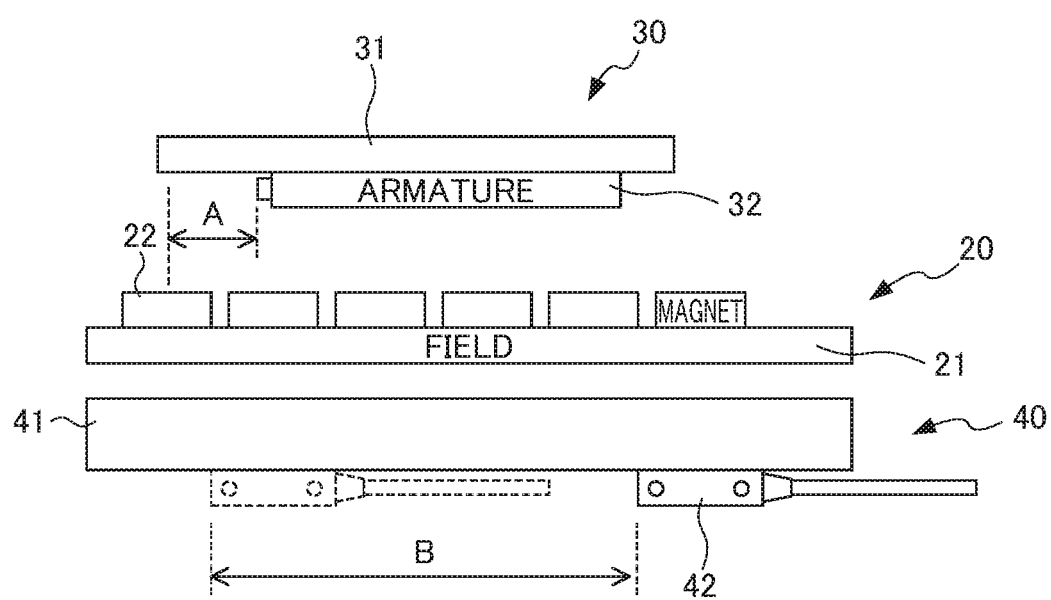
FIG. 2 is a schematic view showing the configuration of a linear motor to be selected by the motor configuration selection device.

FIG. 2 is a schematic view showing the configuration of a linear motor to be selected by the motor configuration selection device 1. In an example described in the embodiment, a case is described in which the configuration of a linear motor and that of an encoder to be provided at the linear motor are to be selected. As shown in FIG. 2, a configuration targeted for selection by the motor configuration selection device 1 can be a linear motor including a field unit 20 in which magnets 22 are arranged at a field 21 and an armature unit 30 in which an armature 32 is arranged on an armature base 31, and a linear encoder 40 in which multiple scale heads 42 are installed on a scale 41.

In the illustration of FIG. 2, a linear motor is to be selected under a required condition to be fulfilled if a distance between the armature 32 and the field 21 becomes a set distance A. Further, an encoder is to be selected under a required condition to be fulfilled if an origin position B of each scale head 42 becomes B=C×N (C is a constant and N is an integer of zero or more). The motor configuration selection device 1 of the embodiment employs a style shown in FIG. 2 for displaying the configuration of a linear motor and that of an encoder (a relationship between the placement of the linear motor and that of the encoder) selected by motor configuration selection processing described later. By doing so, a user to select a linear motor and an encoder is allowed to be provided with the configuration of the selected linear motor and that of the selected encoder in a style that can easily be understood visually.

Referring to FIG. 1, the CPU 11 executes various programs stored in the storage unit 16 to control the motor configuration selection device 1 entirely. For example, the CPU 11 executes a program for processing of selecting the configuration of a linear motor and that of an encoder (hereinafter also called "motor configuration selection processing"). Execution of the program for implementation of the motor configuration selection processing realizes functional structures in the CPU 11 including a UI display control unit 11a (display control unit), a selection condition acquisition unit 11b, and a selection making unit 11c. For implementation of the motor configuration selection processing, the motor configuration selection device 1 can acquire information, where appropriate, by accessing a motor model information DB (not shown) containing various types of information such as the model number or cost of a component (such as a field or an armature) forming a model for a linear motor, and an encoder model information DB (not shown) containing various types of information such as the model number or cost of a component (such as a scale or a scale head) forming a model for an encoder.

The UI display control unit 11a displays a user interface screen (UI screen) for input and output of various types of information by a user in the motor configuration selection processing. For example, the UI display control unit 11a generates a selection tool screen including an input area for input of a selection condition for a linear motor targeted for configuration selection and input of a selection condition for an encoder targeted for configuration selection (condition setting area A1 described later), an area in which a selection result for a linear motor and a selection result for an encoder are shown (selection result display area A2 described later), and an area for display of a graph showing the characteristics of a linear motor (a relationship between force and speed, for example; graph display area A3 described later). In the following, the selection condition for a linear motor targeted for configuration selection and the selection condition for an encoder targeted for configuration selection will also be simply called "selection conditions for a linear motor and an encoder" where appropriate. The "selection conditions for a linear motor and an encoder" show the specification of a linear motor and that of an encoder required by the user.

The selection condition acquisition unit 11b acquires selection conditions (specifically, required specification) for a linear motor and an encoder input through the UI screen. Then, the selection condition acquisition unit 11b stores the acquired selection conditions for a linear motor and an encoder in the storage unit 16.

The selection making unit 11c selects a linear motor and an encoder conforming to the selection conditions based on the selection conditions (required specification) for a linear motor and an encoder in the motor configuration selection processing. In the embodiment, based on various parameters indicating selection conditions for a linear motor input by the user, such as maximum required force or rated force, a gap, a driving voltage, motor arrangement, a machine condition, etc., the selection making unit 11c selects the configuration of a linear motor (such as a model number or specification) conforming to the selection conditions. Further, based on various parameters indicating selection conditions for an encoder input by the user, such as an environment of use, a maximum speed, a resolution, a positioning accuracy, an encoder type (absolute type or incremental type), a communication protocol (data communication protocol in the device), an effective movable area (an area allowing mounting on a linear motor), cost, etc., the selection making unit 11c selects the configuration of an encoder (such as a model number or specification) conforming to the selection conditions.

In the embodiment, the selection making unit 11c scores linear motors and encoders as candidates for selection based on the presence or absence of conformity to a specification item of a selection condition for a linear motor targeted for configuration selection and the presence or absence of conformity to a specification item of a selection condition for an encoder targeted for configuration selection. The selection making unit 11c can revise for the scores of the linear motors and those of the encoders as candidates for selection by setting a weight on each specification item. For example, a weight on each specification item for an encoder can be set through input of an order of priority of each specification item from the user on a screen for assisting in the selection of an encoder ("encoder selection auxiliary screen" described later). According to operation by the user (operation for confirming selection of any of displayed linear motors or any of displayed encoders (such as double-click), for example), the selection making unit 11c confirms the linear motor or the encoder to be selected.

Figure 3:
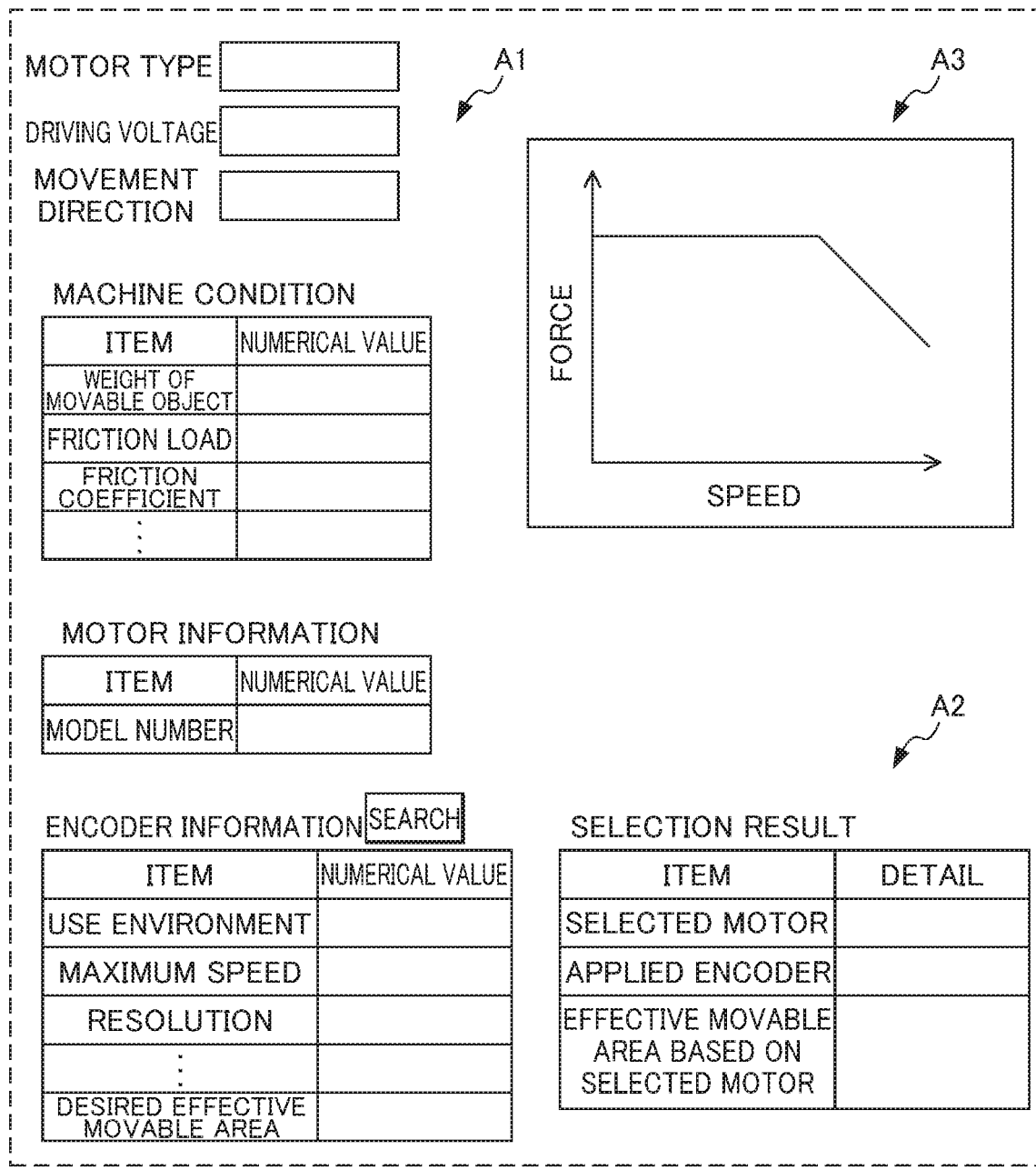
FIG. 3 is a schematic view showing an example of a selection tool screen.

FIG. 3 is a schematic view showing an example of the selection tool screen. Referring to FIG. 3, the UI display control unit 11a displays the selection tool screen, and accepts input of various parameters for selection of a linear motor and an encoder from the user in a condition setting area A1. The selection condition acquisition unit 11b stores the various parameters input as selection conditions for a linear motor and an encoder in the storage unit 16.

The selection making unit 11c acquires the selection conditions for a linear motor and an encoder from the storage unit 16 and makes a selection of a linear motor and an encoder. If operation for selecting an encoder (operation of a "search" button icon, for example) is performed on the selection tool screen, the UI display control unit 11a displays an encoder selection auxiliary screen (see FIG. 4) for assisting in the selection of an encoder. Based on a result of the processing by the selection making unit 11c, the UI display control unit 11a displays information for assisting the user in selecting an encoder, and displays an encoder of a higher degree of conformity to a selection condition for an encoder required from the user.

The selection making unit 11c stores a selection result for a linear motor and a selection result for an encoder in the storage unit 16. Further, the UI display control unit 11a displays the selection result for a linear motor and the selection result for an encoder in the selection result display area A2. On the selection tool screen shown in FIG. 3, a graph showing the characteristics of a linear motor (a relationship between force and speed, for example) is displayed in the graph display area A3 according to the various parameters for selection of a linear motor input in the condition setting area A1. The user can input a selection condition for a linear motor while referring to the characteristics of a linear motor displayed in the graph display area A3 where appropriate.

In the example illustrated in FIG. 3, displayed items in the condition setting area A1 include "motor type" indicating the type of a linear motor to be selected, "driving voltage" for the linear motor, "movement direction" (horizontal direction, vertical direction, etc., for example) of the linear motor, a machine condition for the linear motor, "motor information" indicating the model number or specification of the motor, and "encoder information" indicating a selection condition for an encoder. The "search" button icon for selecting an encoder conforming to "encoder information" is displayed near "encoder information."

In the example illustrated in FIG. 3, displayed items in the selection result display area A2 include "selected motor" indicating the model number or specification of a selected linear motor, "applied encoder" indicating the model number or specification of a selected encoder, and "effective movable area based on selected motor" indicating the movable area (stroke length) of an armature determined based on the specification of the selected motor. A graph showing the speed-force characteristics of a linear motor is shown in the graph display area A3.

FIG. 4 is a schematic view showing an example of the encoder selection auxiliary screen for assisting in the selection of an encoder. According to operation of the "search" button icon on the selection tool screen shown in FIG. 3, the selection making unit 11c acquires a selection condition for an encoder from the storage unit 16 and makes a selection of an encoder. At this time, the selection making unit 11c gives scores set as standards to display encoders as candidates on the encoder selection auxiliary screen aligned in order of their scores.

As shown in FIG. 4, specification items for an encoder displayed on the encoder selection auxiliary screen include "encoder model number," "manufacturer," "effective measurement length," "overall scale length," "resolution," "positioning accuracy," "communication protocol," "encoder type," and "scanning system."

Giving consideration to these technical points as selection conditions makes it possible to easily select an encoder having a specification conforming to the user's requirement. A checkbox "narrow down by cost" and a checkbox "narrow down by delivery time" are displayed as submenus for narrowing down encoders as candidates. By checking these checkboxes, a numerical value entry field corresponding to the checked submenu (an entry field for "purchase price upper limit" or "desired delivery time") becomes ready for filling, and encoders as candidates are narrowed down according to an input numerical value. Further, a specification item ("cost" or "delivery time") corresponding to the checked submenu is additionally displayed on the encoder selection auxiliary screen, and the candidate encoders resulting from the narrowing down are displayed in order of their scores. By doing so, during selection of an encoder, it becomes possible to select an encoder while giving proper consideration to a wide range of conditions (cost or delivery time) other than the technical points.

A checkbox "sort based on priority" is displayed as a submenu on the encoder selection auxiliary screen for giving an order of priority (weight) to a specification item for an encoder. By checking the checkbox "sort based on priority," numerical value entry fields are displayed at specification items for which orders of priority are settable. The user can input the orders of priority of specification items in these numerical value entry fields. After input of the orders of priority of the specification items is finished, the selection making unit 11c gives weights on scores corresponding to the orders of priority to revise for the scores of the encoders as candidates. Then, the selection making unit 11c displays the encoders as candidates in order of their scores after the revision. By doing so, it becomes possible to select an encoder conforming to the user's requirement more properly.

A checkbox "mount compatible part" is displayed as a submenu on the encoder selection auxiliary screen for selecting a mount compatible part.

"Mount compatible part" is a replaceable encoder, such as a maintenance target part (an old model not available for sale and subject only to maintenance) or a discontinued part (an old model not available for sale and maintenance), in comparison to a newly-available existing encoder. The mount compatible part may be an old model stored in a facility, for example, and is handled as a candidate for selection for effective use of existing assets. By checking the checkbox "mount compatible part," an item "mount compatible part" is additionally displayed on the encoder selection auxiliary screen. Information for distinguishing a mount compatible part corresponding to each encoder as a candidate for selection (such as a name, a model number, or a management number) is displayed in the item "mount compatible part."

By selecting the item "mount compatible part" for a particular encoder as a candidate for selection on the encoder selection auxiliary screen, a compatible part comparison screen is displayed on which the specifications of mount compatible parts are displayed in comparison to each other.

FIG. 5 is a schematic view showing an example of the compatible part comparison screen on which the specifications of mount compatible parts are displayed in comparison to each other. The compatible part comparison screen has a first row in which each specification item for an encoder is displayed and a second row in which the specification of an encoder as a source of comparison between mount compatible parts are displayed. In a third row and its subsequent rows of the compatible part comparison screen, specification items for encoders corresponding to mount compatible parts are displayed. For display of the specifications of the encoders as mount compatible parts, items corresponding to specifications differing from the specification of the encoder as a comparison source are displayed in a distinguishing manner. In the illustration of FIG. 5, items corresponding to the specifications of the encoders as mount compatible parts differing from that of the encoder as a comparison source are shown as diagonally shaded areas. On the compatible part comparison screen, information for distinguishing mount compatible parts is provided by displaying the mount compatible parts in colors according to their types. Referring to FIG. 5, for example, "mount compatible part 2" as a maintenance target part is displayed in blue, and "mount compatible part 3" as a discontinued part is displayed in gray. This allows the user to easily understand the attributes of the mount compatible parts.

A checkbox "sort in consideration of required specification" is displayed as a submenu on the compatible part comparison screen for sorting the mount compatible parts in consideration of a specification required by the user. By checking the checkbox "sort in consideration of required specification," item cells displayed in the first row become selectable to allow the user to select these cells in descending order of degrees of importance (orders of priority). After selection of the cells is finished, the selection making unit 11c sorts the mount compatible parts in descending order of probability of achieving an item of a high degree of importance. This makes it possible to select from the mount compatible parts one having a higher degree of conformity to the required specification in a simple way.

Referring to FIG. 1, the ROM 12 contains various system programs written in advance for controlling the motor configuration selection device 1. The RAM 13 is configured with a semiconductor memory, such as a dynamic random access memory (DRAM). Data generated during execution of various types of processing by the CPU 11 is stored into the RAM 13. The input unit 14 is configured with an input device including a keyboard and a mouse or a touch sensor, and accepts input of various types of information from the user to the motor configuration selection device 1.

The display unit 15 is configured with a display device, such as a liquid crystal display (LCD), and displays results of various types of processing by the motor configuration selection device 1. The storage unit 16 is configured with a nonvolatile storage device, such as a hard disk or a flash memory, and stores a program for the motor configuration selection processing, etc. The storage unit 16 further stores selection conditions for a linear motor and an encoder, and a selection result for a linear motor and a selection result for an encoder.

The communication unit 17 includes a communication interface such as a wired or wireless LAN or a USB to perform signal processing based on a predetermined communication standard. The communication unit 17 controls communication between the motor configuration selection device 1 and a different device.

[Operation]

The operation of the motor configuration selection device 1 will be described next.

[Motor Configuration Selection Processing]

Figure 6:
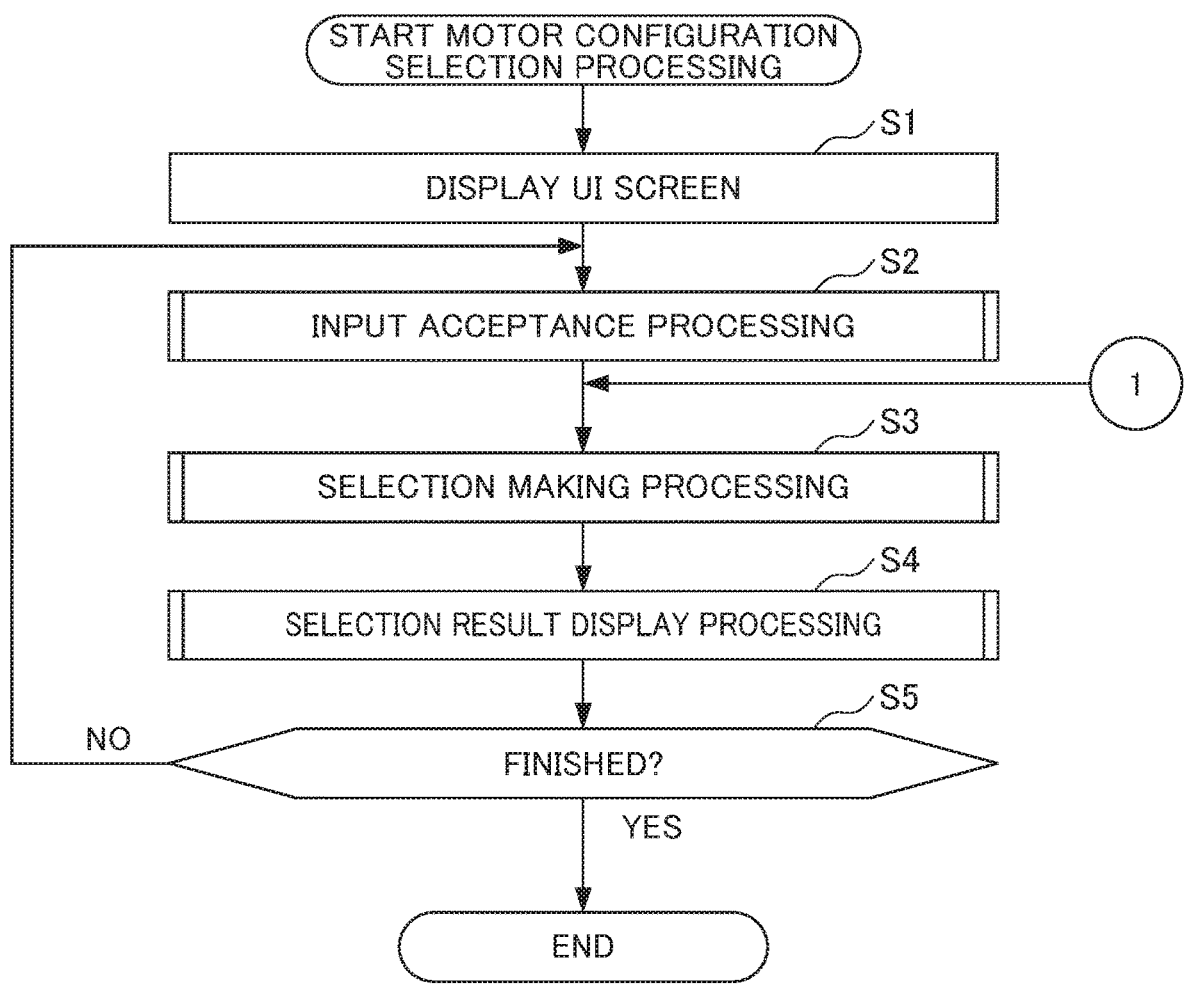
FIG. 6 is a flowchart showing a flow of motor configuration selection processing performed by the motor configuration selection device.

FIG. 6 is a flowchart showing a flow of the motor configuration selection processing performed by the motor configuration selection device 1. The motor configuration selection processing is started by input of an instruction to start the motor configuration selection processing through the input unit 14.

In step S1, the UI display control unit 11a displays an UI screen for input and output of various types of information by a user in the motor configuration selection processing. In step S2, the selection condition acquisition unit 11b performs input acceptance processing of acquiring selection conditions for a linear motor and an encoder according to input by the user. In step S3, the selection making unit 11c performs selection making processing of selecting a linear motor and an encoder conforming to the selection conditions.

In step S4, the UI display control unit 11a performs selection result display processing of displaying a selection result for the linear motor and a selection result for the encoder. In step S5, the UI display control unit 11a determines whether an instruction to finish the motor configuration selection processing has been given. If an instruction to finish the motor configuration selection processing has not been given, a determination NO is made in step S5. Then, the processing goes to step S2. If an instruction to finish the motor configuration selection processing has been given, a determination YES is made in step S5. Then, the motor configuration selection processing is finished.

[Input Acceptance Processing]

Figure 7:
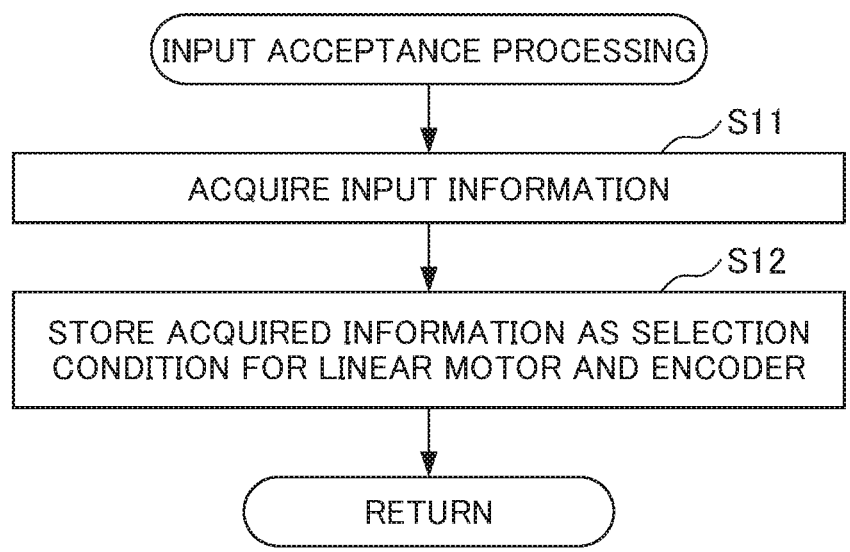
FIG. 7 is a flowchart showing a flow of input acceptance processing performed in step S2 of the motor configuration selection processing.

The input acceptance processing performed in step S2 of the motor configuration selection processing will be described next. FIG. 7 is a flowchart showing a flow of the input acceptance processing performed in step S2 of the motor configuration selection processing. In step S11, the selection condition acquisition unit 11b acquires information input to the UI screen. In step S12, the selection condition acquisition unit 11b stores the acquired information as various parameters for selection of a linear motor and an encoder (selection conditions for a linear motor and an encoder) in the storage unit 16. After step S12, the processing returns to the motor configuration selection processing.

[Selection Making Processing]

Figure 8:
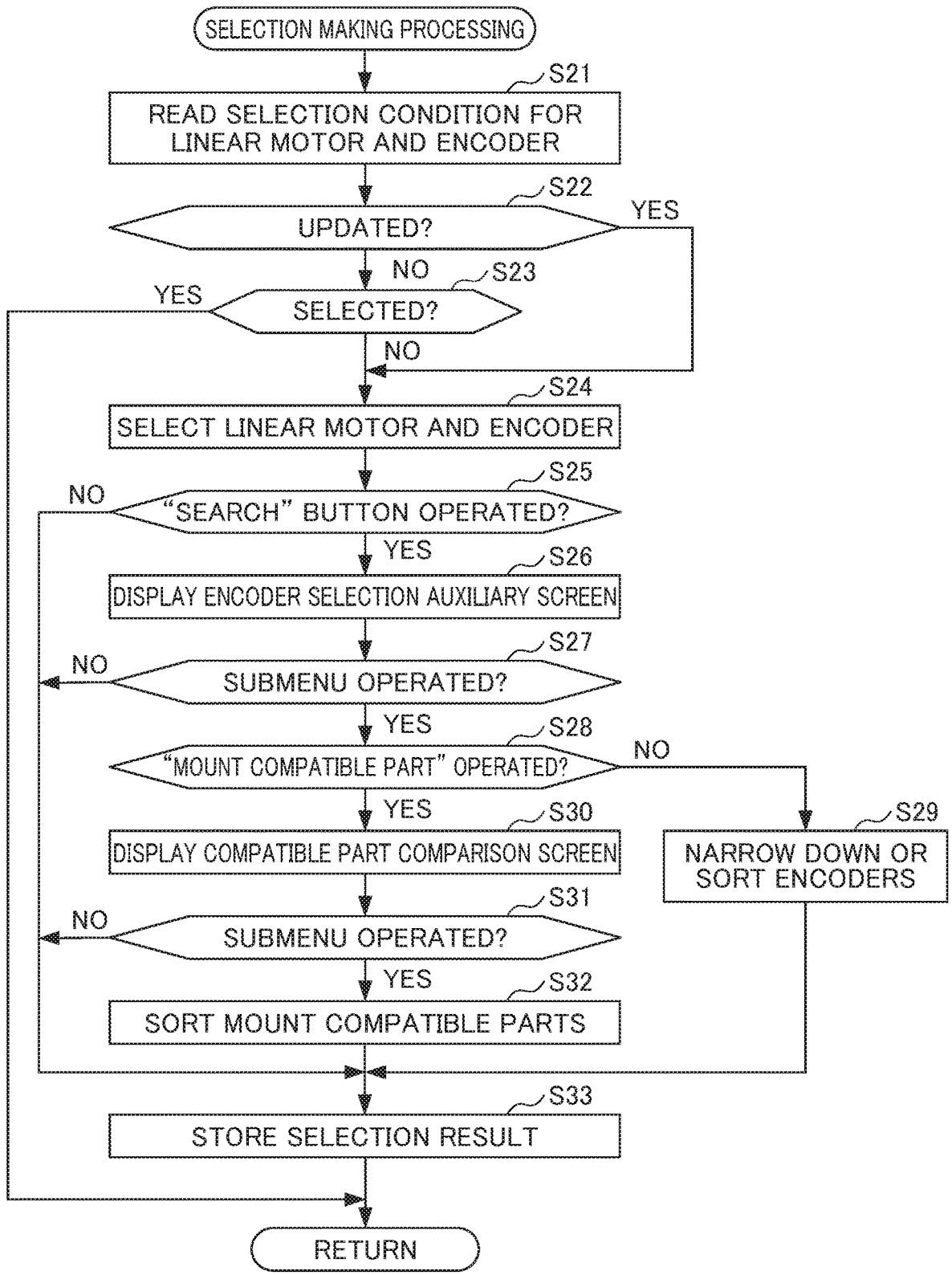
FIG. 8 is a flowchart showing a flow of selection making processing performed in step S3 of the motor configuration selection processing.

The selection making processing performed in step S3 of the motor configuration selection processing will be described next. FIG. 8 is a flowchart showing a flow of the selection making processing performed in step S3 of the motor configuration selection processing. In step S21, the selection making unit 11c reads the various parameters for selection of a linear motor and an encoder (selection conditions for a linear motor and an encoder) from the storage unit 16.

In step S22, the selection making unit 11c determines whether the various parameters for selection of a linear motor and an encoder have been updated. In the absence of update of the various parameters for selection of a linear motor and an encoder, a determination NO is made in step S22. Then, the processing goes to step S23. In the presence of update of the various parameters for selection of a linear motor and an encoder, a determination YES is made in step S22. Then, the processing goes to step S24.

In step S23, the selection making unit 11c determines whether a linear motor and an encoder have already been selected based on various parameters currently input for selection of a linear motor and an encoder (current selection conditions for a linear motor and an encoder). If a linear motor and an encoder have already been selected based on the various parameters currently input for selection of a linear motor and an encoder, a determination YES is made in step S23. Then, the processing returns to the motor configuration selection processing. If a linear motor and an encoder have not been selected based on the various parameters currently input for selection of a linear motor and an encoder, a determination NO is made in step S23. Then, the processing goes to step S24.

In step S24, the selection making unit 11c refers to the motor model information DB and the encoder model information DB to select a linear motor and an encoder conforming to the various parameters currently input for selection of a linear motor and an encoder (current selection conditions for a linear motor and an encoder). If the various parameters have been updated for selection of only one of a linear motor and an encoder, a selection result updated in step S24 is only for a linear motor or an encoder for which the various parameters have been updated.

In the processing of step S24, the selection making unit 11c scores linear motors and encoders as candidates for selection based on the presence or absence of conformity to a specification item of a selection condition for a linear motor targeted for configuration selection and the presence or absence of conformity to a specification item of a selection condition for an encoder targeted for configuration selection. The selection making unit 11c revises for the scores of the linear motors and those of the encoders as candidates for selection by setting a weight on each specification item. Then, the selection making unit 11c selects a linear motor having the highest score from those as candidates for selection as a selection result, and selects an encoder having the highest score from those as candidates for selection as a selection result. In addition to selecting a linear motor having the highest score from those as candidates for selection as a selection result and selecting an encoder having the highest score as a selection from those as candidates for selection result, a predetermined number of candidates having high scores can be displayed, and one of these candidates can be selected by the user as a selection result.

In step S25, the selection making unit 11c determines whether the "search" button icon on the selection tool screen has been operated. If the "search" button icon on the selection tool screen has not been operated, a determination NO is made in step S25. Then, the processing goes to step S33. If the "search" button icon on the selection tool screen has been operated, a determination YES is made in step S25. Then, the processing goes to step S26.

In step S26, the UI display control unit 11a displays the encoder selection auxiliary screen. In step S27, the UI display control unit 11a determines whether operation for selecting a submenu (checking a checkbox) has been performed on the encoder selection auxiliary screen. The encoder selection auxiliary screen displays the encoders as candidates aligned in order of their scores. In a default state, an encoder having the highest score is selected. According to the user's operation for selection, any of the displayed encoders becomes selected. The user may perform operation for confirming selection of and of the encoders from the displayed encoders. By doing so, the selected encoder can be confirmed immediately. If operation for selecting a submenu (checking a checkbox) has not been performed on the encoder selection auxiliary screen, a determination NO is made in step S27. Then, the processing goes to step S33. If operation for selecting a submenu (checking a checkbox) has been performed on the encoder selection auxiliary screen, a determination YES is made in step S27. Then, the processing goes to step S28.

In step S28, the UI display control unit 11a determines whether operation for selecting "mount compatible part" as a submenu has been performed. If operation for selecting "mount compatible part" as a submenu has not been performed, a determination NO is made in step S28. Then, the processing goes to step S29. If operation for selecting "mount compatible part" as a submenu has been performed, a determination YES is made in step S28. Then, the processing goes to step S30.

In step S29, the selection making unit 11c narrows down or sorts the encoders as candidates according to the selected submenu. A result of this narrowing down or sorting is displayed on the encoder selection auxiliary screen by the UI display control unit 11a. After step S29, the processing goes to step S33.

In step S30, the UI display control unit 11a displays the compatible part comparison screen. Encoders as mount compatible parts compatible with an encoder as a comparison source are displayed in a list on the compatible part comparison screen. In a default state, the encoder as a comparison source is selected. According to the user's operation for selection, an encoder corresponding to any of the displayed mount compatible parts becomes selected. The user may perform operation for confirming selection of the encoder corresponding to any of the displayed mount compatible parts. By doing so, the selected encoder can be confirmed immediately.

In step S31, the UI display control unit 11a determines whether operation for selecting the submenu (checking the checkbox "sort in consideration of required specification") has been performed on the compatible part comparison screen. If operation for selecting the submenu (checking the checkbox "sort in consideration of required specification") has not been performed on the compatible part comparison screen, a determination NO is made in step S31. Then, the processing goes to step S33. If operation for selecting the submenu (checking the checkbox "sort in consideration of required specification") has been performed on the compatible part comparison screen, a determination YES is made in step S31. Then, the processing goes to step S32.

In step S32, the selection making unit 11c accepts the user's selection of specification item cells in descending order of degrees of importance, and sorts the mount compatible parts in descending order of probability of achieving an item of a high degree of importance. A result of this sorting is displayed on the compatible part comparison screen by the UI display control unit 11a. In step S33, the selection making unit 11c stores the selection result for the linear motor and the selection result for the encoder in the storage unit 16.

At this time, the linear motor selected in step S24 is stored as the selection result, and the encoder finally selected by the selection making processing is stored as the selection result. After step S33, the processing returns to the motor configuration selection processing.

[Selection Result Display Processing]

Figure 9:
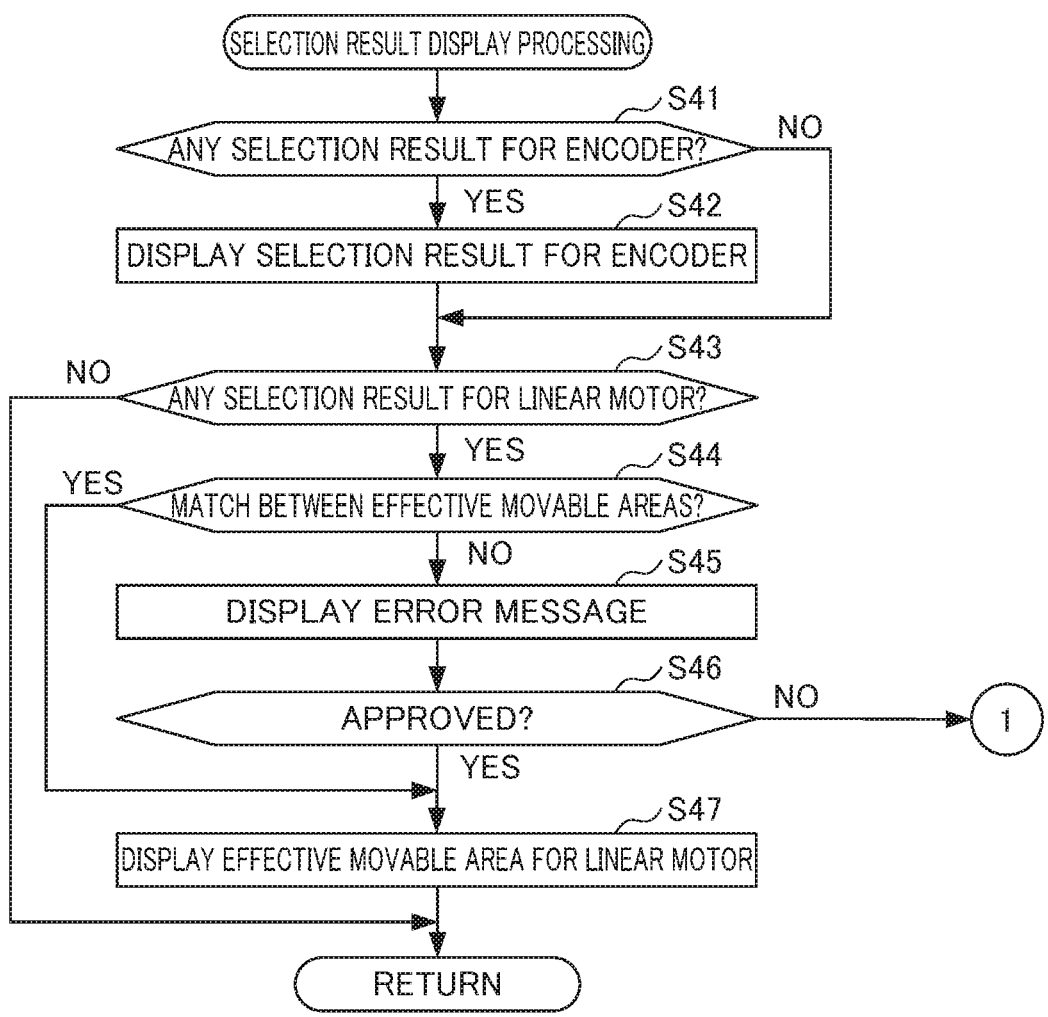
FIG. 9 is a flowchart showing a selection result display processing performed in step S4 of the motor configuration selection processing.

The selection result display processing performed in step S4 of the motor configuration selection processing will be described next. FIG. 9 is a flowchart showing the selection result display processing performed in step S4 of the motor configuration selection processing.

In step S41, the UI display control unit 11a determines whether a selection result for an encoder is stored in the storage unit 16. If a selection result for an encoder is stored in the storage unit 16, a determination YES is made in step S41. Then, the processing goes to step S42. If a selection result for an encoder is not stored in the storage unit 16, a determination NO is made in step S41. Then, the processing goes to step S43.

In step S42, the UI display control unit 11a displays the selection result for the encoder in the selection result display area A2 (the field "applied encoder") on the selection tool screen. In step S43, the UI display control unit 11a determines whether a selection result for a linear motor is stored in the storage unit 16. If a selection result for a linear motor is not stored in the storage unit 16, a determination NO is made in step S43. Then, the processing returns to the motor configuration selection processing. If a selection result for a linear motor is stored in the storage unit 16, a determination YES is made in step S43. Then, the processing goes to step S44.

In step S44, the presence or absence of match between an effective movable area for a linear motor and a desired effective movable area for an encoder is determined. The presence or absence of match between the effective movable area for a linear motor and the desired effective movable area for an encoder can be determined by determining whether the desired effective movable area for an encoder is longer than the effective movable area for a linear motor, for example. If there is match between the effective movable area for a linear motor and the desired effective movable area for an encoder, a determination YES is made in step S44. Then, the processing goes to step S47. If there is no match between the effective movable area for a linear motor and the desired effective movable area for an encoder, a determination NO is made in step S44. Then, the processing goes to step S45.

In step S45, the UI display control unit 11a displays an error messages indicating the absence of match of the desired effective movable area for an encoder with the effective movable area for a linear motor. This error message includes a button icon for reselecting an encoder and a button icon for approving a state without match between the effective movable area for a linear motor and the desired effective movable area for an encoder.

In step S46, the UI display control unit 11a determines whether the button icon for approving a state without match between the effective movable area for a linear motor and the desired effective movable area for an encoder has been operated. If the button icon for approving a state without match between the effective movable area for a linear motor and the desired effective movable area for an encoder has been operated, a determination YES is made in step S46. Then, the processing goes to step S47. If the button icon for approving a state without match between the effective movable area for a linear motor and the desired effective movable area for an encoder has not been operated (specifically, if the button icon for reselecting an encoder has been operated), a determination NO is made in step S46. Then, the processing goes to step S3 of the motor configuration selection processing. As a result, in the absence of match between the effective movable area for a linear motor and the desired effective movable area for an encoder, a selection condition for an encoder is changed. This makes it possible to properly select an encoder conforming to the selected linear motor.

In step S47, the UI display control unit 11a displays the effective movable area for the selected linear motor in the result display area on the selection tool screen. At this time, the UI display control unit 11a generates a model for the configuration of the selected linear motor and that for the configuration of the selected encoder and displays the generated models by following the style shown in FIG. 2. After step S47, the processing returns to the motor configuration selection processing.

As described above, in the motor configuration selection device 1 according to the embodiment, candidates for an encoder conforming to a required specification of a linear motor are displayed when selecting the configuration of a linear motor. Thus, even if a user to select a linear motor does not have abundant knowledge about an encoder, the user can easily understand a proper encoder according to the configuration of a linear motor. This makes it possible to select an encoder conforming to the configuration of a linear motor in shorter time and a simple way.

The motor configuration selection device 1 generates a model for the configuration of a selected linear motor and that for the configuration of a selected encoder and displays the generated models by following the style shown in FIG. 2. By doing so, a user to select a linear motor and an encoder is allowed to be provided with the configuration of the selected linear motor and that of the selected encoder in a style that can easily be understood visually. Specifically, according to the present invention, the configuration of an encoder to be provided at a linear motor can be selected more properly.

First Modification

Figure 10:
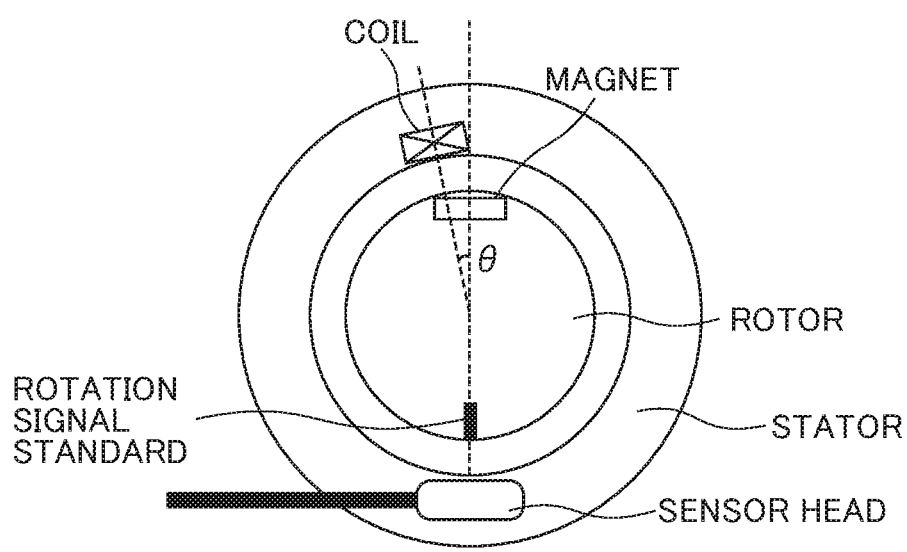
FIG. 10 is a schematic view showing the configuration of a rotary motor to be selected by the motor configuration selection device.

In the example described in the foregoing embodiment, a motor to be selected by the motor configuration selection device 1 is a linear motor. Meanwhile, the motor configuration selection device 1 is further applicable to selection of a rotary motor. If a rotary motor is to be selected, the configuration of a rotary encoder is selected to conform to the configuration of the motor to be selected. FIG. 10 is a schematic view showing the configuration of a rotary motor to be selected by the motor configuration selection device 1. Referring to FIG. 10, a rotor is provided with multiple magnets arranged at regular intervals, and a stator is provided with multiple coils arranged at regular intervals. One of the magnets of the rotor and one of the coils of the stator are shown as representatives. Illustrations of the other magnets and the other coils are omitted.

As shown in FIG. 10, to select the configuration of a rotary motor and that of a rotary encoder, required specifications are set in which, for example, a phase difference between a particular magnet of the rotor and a particular coil of the stator is an angle $\theta$, and a rotation signal standard (a member as a trigger for generation of a rotation signal) and a sensor head for detecting the rotation signal standard are on the same line in a radial direction. Like in the foregoing embodiment, the selection tool screen of even this case allows input of a selection condition for a rotary motor targeted for configuration selection and input of a selection condition for a rotary encoder targeted for configuration selection. Based on the selection conditions (required specifications) about a rotary motor and a rotary encoder, the selection making unit 11c can select a rotary motor and a rotary encoder conforming to the selection conditions in the motor configuration selection processing. Specifically, according to the present invention, the configuration of a rotary encoder to be provided at a rotary motor can also be selected more properly.

The present invention should not be limited to the foregoing embodiment and modification, and various changes, modifications, etc. are applicable to the present invention. In the description of the foregoing embodiment, for example, in the absence of match between an effective movable area for a linear motor and a desired effective movable area for an encoder, step S3 of the motor configuration selection processing, namely, the selection making processing, is performed again. However, this is not the only case. For example, candidate encoders having been subjected to scoring and having been given high scores may be narrowed down to a candidate matching the effective movable area for a linear motor, thereby selecting an encoder conforming to the configuration of the linear motor. In this case, an encoder conforming to a required specification can be selected by simpler processing.

In the example described in the foregoing embodiment, the configuration of an encoder is selected together with selection of the configuration of a motor. However, this is not the only case. For example, the present invention is applicable to selection of the configuration of an encoder conforming to the configuration of a motor while the configuration of the motor is fixed.

The function of the motor configuration selection device 1 of the foregoing embodiment can be realized entirely or partially by hardware, by software, or by a combination of hardware and software. Being realized by software means being realized by reading and execution of a program by a processor. To configure the motor configuration selection device 1 by hardware, the function of the motor configuration selection device 1 can be configured partially or entirely using an integrated circuit (IC), such as an application specific integrated circuit (ASIC), a gate array, a field-programmable gate array (FPGA), or a complex programmable logic device (CPLD), for example.

The function of the motor configuration selection device 1 can be configured entirely or partially by software in a computer including a storage unit, such as a hard disk or a ROM, storing programs describing all or part of the operation of the motor configuration selection device 1, a DRAM containing data required for calculation, a CPU, and a bus for connection between the units. In this computer, the function of the motor configuration selection device 1 can be realized by storing information necessary for calculation into the DRAM and making the CPU execute the programs.

These programs can be stored in various types of computer-readable media and can be supplied to the computer. The computer-readable media include various types of tangible storage media. Examples of the computer-readable media include a magnetic storage medium (a flexible disk, magnetic tape, or a hard disk drive, for example), a magneto-optical storage medium (a magneto-optical disk, for example), a CD read-only memory (CD-ROM), a CD-R, a CD-R/W, a digital versatile disk ROM (DVD-ROM), a DVD-R, a DVD-R/W, and a semiconductor memory (a mask ROM, a programmable ROM (PROM), an erasable PROM (EPROM), a flash memory, or a random access memory (RAM), for example). These programs may be distributed by being downloaded onto a computer of a user through a network.

While the embodiment of the present invention has been described in detail above, this embodiment is merely a specific example employed for implementing the present invention. The technical scope of the present invention should not be limited to the above-described embodiment. Various changes of the present invention can be devised within a range not departing from the substance of the invention. These changes are also covered by the technical scope of the present invention.

EXPLANATION OF REFERENCE NUMERALS

1 Motor configuration selection device
11 CPU
11a UI display control unit (display control unit)
11b Selection condition acquisition unit
11c Selection making unit
12 ROM
13 RAM
14 Input unit
15 Display unit
16 Storage unit
17 Communication unit
20 Field unit
21 Field
22 Magnet
30 Armature unit
31 Armature base
32 Armature
40 Linear encoder
41 Scale
42 Scale head

What is claimed is:

1. A motor configuration selection device comprising:
a selection condition acquisition unit that acquires a selection condition for selecting an encoder to be provided at a motor; and
a selection making unit that makes a selection of an encoder to be provided at the motor from a set of at least two candidate encoders, the selection being based on the selection condition acquired by the selection condition acquisition unit and a mechanical feature of the motor, the mechanical feature of the motor including one or more of,
a maximum required force of the motor,
a rated force of the motor,
a driving voltage of the motor,
an arrangement of the motor,
a maximum speed of the motor, and
an effective movable area of the motor.

2. The motor configuration selection device according to claim 1, comprising a display control unit that displays a view showing a relationship between the placement of the encoder selected by the selection making unit and the placement of the motor determined when the encoder and the motor are put in their positions.

3. The motor configuration selection device according to claim 1, wherein the selection making unit selects an encoder conforming to the selection condition based on a score given by putting weights on multiple items of the selection condition for the encoder.

4. The motor configuration selection device according to claim 1, wherein the selection making unit selects an encoder to be provided at the motor based on at least one of the cost and delivery time as the selection condition of the encoder to be selected.

5. The motor configuration selection device according to claim 1, wherein the selection making unit selects an encoder to be provided at the motor based on the selection condition including an environment of use of the motor, a positioning accuracy, a communication protocol, and an encoder type.

6. The motor configuration selection device according to claim 1, wherein if the mechanical feature of the motor and the selection condition for the encoder do not match, the selection making unit changes the selection condition for the encoder to conform to the mechanical feature of the motor.

7. The motor configuration selection device according to claim 1, wherein the selection making unit defines a different encoder as a candidate for selection having compatibility with the encoder conforming to the selection condition.

8. The motor configuration selection device according to claim 7, wherein the selection making unit presents information in a distinguishing manner about a difference between the encoder conforming to the selection condition and the different encoder having the compatibility.

9. The motor configuration selection device according to claim 8, wherein, regarding the difference between the encoder conforming to the selection condition and the different encoder having the compatibility, the selection making unit ranks the different encoder having the compatibility based on a score given by putting weights on multiple items of the selection condition for the encoder.

10. A motor configuration selection method comprising: a selection condition acquisition step of acquiring a selection condition for selecting an encoder to be provided at a motor; and
a selection making step of making a selection of an encoder to be provided at the motor from a set of at least two candidate encoders, the selection being based on the selection condition acquired in the selection condition acquisition step and a mechanical feature of the motor, the mechanical feature of the motor including one or more of,
a maximum required force of the motor,
a rated force of the motor,
a driving voltage of the motor,
an arrangement of the motor,
a maximum speed of the motor, and
an effective movable area of the motor.

11. A non-transitory computer readable medium storing a program that causes a computer to implement:
a selection condition acquisition function of acquiring a selection condition for selecting an encoder to be provided at a motor; and
a selection making function of making a selection of an encoder to be provided at the motor from a set of at least two candidate encoders, the selection being based on the selection condition acquired by the selection condition acquisition function and a mechanical feature of the motor, the mechanical feature of the motor including one or more of,
a maximum required force of the motor,
a rated force of the motor,
a driving voltage of the motor,
an arrangement of the motor,
a maximum speed of the motor, and
an effective movable area of the motor.

12. The motor configuration selection device of claim 1, wherein the set of at least two candidate encoders indicates, for each of the at least two candidate encoders, a selection condition that includes one or more of,
a use condition,
a machine configuration, or
an operating condition.

13. The motor configuration selection method of claim 10, wherein the set of at least two candidate encoders indicates, for each of the at least two candidate encoders, a selection condition that includes one or more of,
a use condition,
a machine configuration, or
an operating condition.

14. The non-transitory computer readable medium of claim 11, wherein the set of at least two candidate encoders indicates, for each of the at least two candidate encoders, a selection condition that includes one or more of,
a use condition,
a machine configuration, or
an operating condition.

15. The motor configuration selection device of claim 1, further comprising: a display control unit that displays a comparison screen including at least one specification for at least one encoder of the set of at least two candidate encoders.

16. The motor configuration selection method of claim 10, further comprising:
a displaying step of displaying a comparison screen including at least one specification for at least one encoder of the set of at least two candidate encoders.

17. The non-transitory computer readable medium of claim 11, further comprising:
a displaying function of displaying a comparison screen including at least one specification for at least one encoder of the set of at least two candidate encoders.

* * * * *